UNITED STATES PATENT OFFICE.

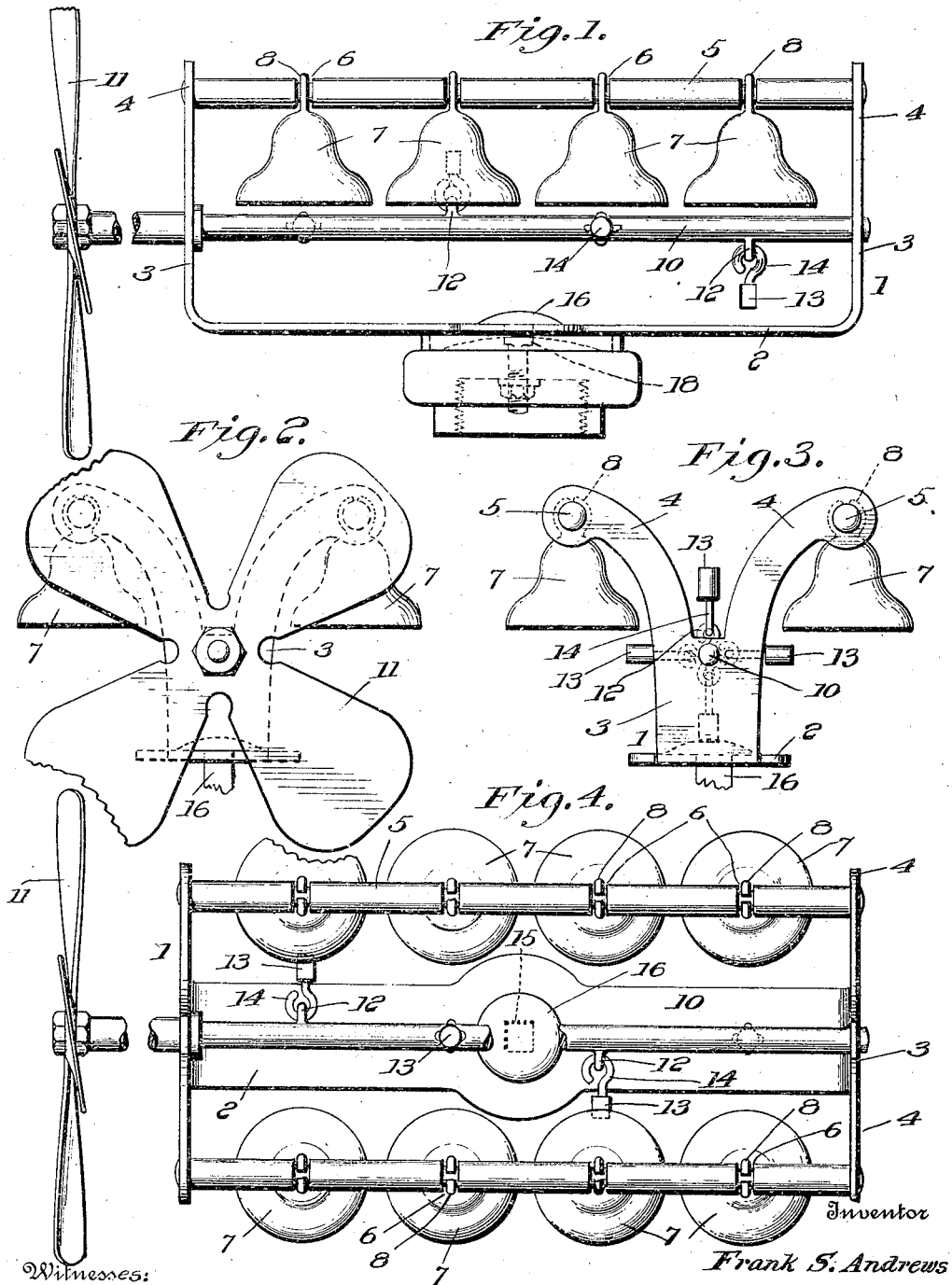

FRANK S. ANDREWS, OF BERKELEY, CALIFORNIA.

AUTOMOBILE ALARM-BELL.

1,262,907.　　　　Specification of Letters Patent.　　Patented Apr. 16, 1918.

Application filed January 15, 1917.　Serial No. 142,349.

*To all whom it may concern:*

Be it known that I, FRANK S. ANDREWS, a citizen of the United States, residing at Berkeley, in the county of Alameda and State of California, have invented certain new and useful Improvements in Automobile Alarm-Bells, of which the following is a specification.

This invention is an alarm for vehicles and comprises certain novel features hereinafter set forth.

The invention is illustrated in the accompanying drawing which forms a part of this specification and the appended claims.

Referring to the drawing:

Figure 1 is a side elevation of the device.

Fig. 2 is a front elevation thereof.

Fig. 3 is a rear elevation thereof.

Fig. 4 is a plan view of the device.

Numeral 1 indicates a supporting frame comprising a base member 2 and end upright members 3 formed respectively with upwardly and outwardly extending arms 4. A pair of rods 5 extend lengthwise of the frame, and are secured at their ends in the upper end of an arm at each end of the frame. Said rods are provided with a plurality of annular grooves 6.

A plurality of bells 7 are suspended on said rods by means of eyes 8 secured to the top of the bells, which eyes surround the rods within the grooves 6, whereby the bells are suspended in such manner that they may swing freely.

A shaft 10 extends lengthwise of the frame through the end upright members 3 and is journaled in said members. On the front end of said shaft is secured a wind propeller 11. The shaft 10 has a plurality of hooks 12 projecting therefrom at points respectively adjacent the bells 7. Bell clappers 13 are secured to hooks 14 which hook into the shaft hooks 12, whereby the clappers are adapted to swing, as the shaft 10 is rotated, and strike and sound the bells.

The lower frame member 2 is provided with a square opening 15 through which a bolt 16 may be inserted and through the top of an automobile radiator cap, and a nut 17 screwed on the lower end of the bolt against the inner face of the top wall of the cap, to secure the device in position on an automobile. The bolt may have a square portion 18 to fit the square opening 15 to prevent the device turning on the bolt.

The device is secured on the radiator cap of an automobile with the propeller toward the front of the automobile. As the automobile travels the wind coming in contact with the propeller turns the propeller and shaft 10, and the clappers 13 strike and ring the bells and gives warning of the approach of the automobile. The effect of the ringing bells is substantially the same as that of sleigh bells.

Having described my invention, I claim as new and desire to secure by Letters Patent:

A device of the character disclosed comprising a frame, rods on said frame, said rods being provided with a plurality of annular grooves, bells, eyes at the top of said bells adapted to surround the rods within the grooves to suspend the bells freely from the rods, a shaft journaled in said frame, hooks on said shaft, clappers, hooks on said clappers hooking into the hooks on said shaft, and a wind propeller on said shaft for rotating the shaft and causing the clappers to strike and ring the bells.

In testimony whereof I affix my signature.

FRANK S. ANDREWS.

Copies of this patent may be obtained for five cents each, by addressing the "Commissioner of Patents, Washington, D. C."